April 24, 1956     D. GALE     2,743,436
COMPUTER

Filed April 10, 1946     2 Sheets—Sheet 1

$A_H$ = AIRCRAFT HEADING
$A_D$ = DRIFT ANGLE
$A_S$ = SPINNER POSITION
$A_B$ = BEARING OF TR
$A_P$ = BEARING OF R

*INVENTOR.*
DAVID GALE
BY   *M. O. Hayes*

ATTORNEY

INVENTOR.
DAVID GALE

United States Patent Office 2,743,436
Patented Apr. 24, 1956

2,743,436

COMPUTER

David Gale, New York, N. Y., assignor, by mesne assignments, to the United States of America as represented by the Secretary of the Navy Application April 10, 1946, Serial No. 661,021

7 Claims. (Cl. 343—5)

This invention relates to electrical apparatus and more particularly to an electronic steering system to enable a plane to quickly get on course for range offset bombing and to generally aid in the navigation of aircraft.

In bombing it is frequently desirable to use a reference target of known geographic location to determine the course to be flown, instead of the target to be bombed in order to facilitate the solution of the bombing problem. The important reason for the use of this technique, known in the art as range offset bombing, is that often the target to be bombed will not produce a definite indication on the indicator of a radio pulse echo detection system, whereas some other target in the adjacent area will produce a pronounced indication which can be utilized in steering a course over the desired target. A necessary condition for this type of bombing is that the plane be quickly brought on a course determined by a line connecting the target to be bombed and the reference target. Similarly, this technique has possibilities as a blind landing aid for airfields. By erecting a suitable reference target in known geographic location at one end of the airstrip, the plane can be steered to a course determined by the target and the airstrip.

Any radio pulse echo detection system with a sufficiently directional antenna can be used for determining the location of the reference target with respect to the plane. In addition, when such apparatus is used in conjunction with bombing or navigation it is especially desirable that the detection system operator have a convenient means of informing the pilot of the plane the direction he should turn the plane, if necessary, in order that the desired course be followed. Such a means is called a pilot's direction indicator, hereinafter referred to as P. D. I., which is ordinarily a center scale direct current milliammeter properly marked to indicate the direction and number of degrees for the desired turn. Such instruments have been used to a considerable extent in the past with various means for controlling them.

One of the objects of the present invention, therefore, is to provide a system whereby the detection system operator can by means of the P. D. I., direct the plane to the desired target for range offset bombing.

Another object of the present invention is to enable the detection system operator, by means of simple preliminary adjustments, and turns by the pilot of the plane, to put the plane on the proper course to bomb a desired target employing the range offset bombing technique, so that thereafter any deviation of the plane from this course will be automatically indicated to the pilot.

A still further object of this invention is to make the operational techniques for the detection system operator and pilot as simple as possible when using the range offset system of bombing.

Another object of this invention is to enable the detection system operator to direct the pilot to the desired approach course when used as a blind landing navigational aid.

The invention will be best understood by reference to the appended drawings in which.

Figure 1:
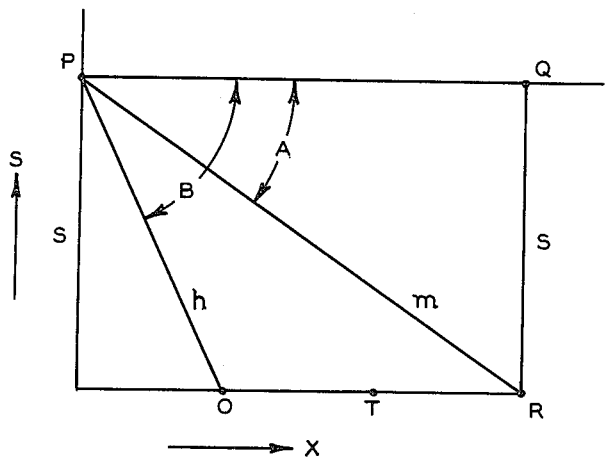
Fig. 1 illustrates the geometry involved in arriving at the instrumentation to be used.

Referring to the drawings, and more particularly to Fig. 1, the plane is at P, the target at T, and the reference target at R. It is desired to bring the plane to the line TR and to have it heading along TR as quickly as possible. In the diagram PQ is drawn parallel to TR and the direction of TR and PQ will be called the course direction. PO is the direction of the plane ground track and B is the angle it makes with the course direction. The bearing of the reference point from the course direction is given by angle A. The distance the plane is off course is given by S and will be called the position error. The distance from the plane to the reference point is $n$. It is apparent from the diagram that when the plane is on course angles A and B both equal zero.

The following is a discussion of the possible methods of getting on course. It is clear that to get on course it is necessary to satisfy the relation that angle B must equal zero when S equals zero. It is also apparent that the further the plane is off course the more it can afford to deviate from the course heading in order to get back. That is, the larger S is, the larger the angle B can be. The first assumption would be to make angle B proportional to S in the development of a steering formula, but large values of S would give values of B greater than 90 degrees which would make the plane actually head away from the desired track. This difficulty can be avoided by making S proportional to tan B.

$$S = -K \tan B$$

By the following mathematical discussion it will be shown that if this relationship is maintained the plane will approach the desired course on an exponential path.

$$S = -K \tan B \text{ or } \tan B = -S/K$$

By moving an infinitesimal distance along the ground track the plane moves a distance $dS$ toward the desired course and at the same time a distance $dX$ along the desired course line. Hence $$dS = \tan B \quad dX = -S/K dX$$

Solving, $$\frac{dS}{S} = \frac{dX}{K}$$

and integrating, $$\log_e S = \frac{X}{K} + C$$

or $$S = Ce^{-\frac{X}{K}}$$

where C is a constant and equal to S at the start of the problem. The proportionality constant K determines how quickly the plane gets on the desired course. Starting at any given point the plane will be 63 percent of the way to the desired course line by the time it has moved K miles along the course line in the direction of the reference target. Thus to get on course quickly, K should be made as small as possible, limited only by the maneuverability of the plane. From this relation it follows that angle B should be made relatively large.

However, since the tangent function is difficult to work with it is desirable that some other relationship be used. If the point P is so located that the distance S is small compared to the distance $m$, the angle B would necessarily be small, and since for small angles the sine is practically equal to the tangent we may use $$S = K \sin B$$

and since $\sin B = S/h$, then $K = h$ and the curve described by the plane will be a tractrix, which can be described as the path the plane would take if it were being towed by another plane moving along the desired course line, the length of the tow rope being of constant length $K$, and the plane always heading toward the towing plane. It is clear that the shorter the tow rope, that is the smaller the value of $K$, the faster the towed plane will straighten out.

The steering equation is arbitrarily made $$A = k \sin B$$

From the geometry of Fig. 1 it is seen that $\sin A = S/m$, and since the angle A must necessarily be small if the angle B is small as suggested above, $\sin A \cong A$, and $$\frac{S}{m} \cong k \sin B$$

Therefore $S \cong K \sin B$, where $K = km$. Since in the process of getting on course, $m$ changes by only a small percent as compared with S, we may consider $m$ as being constant over short intervals of time. We then have the case of the tractrix where the length of the tow rope is K. However, as the plane approaches the target the value of $m$ decreases, thus shortening the tow rope, and the steering gets tighter, which is as it should be. From the foregoing discussion, then, it is seen that the plane does not follow a true exponential, and since the value of K changes, neither does it follow a true tractrix. It follows then that the plane traces some curve similar to both the exponential and tractrix, but whose equation will be more complex than that for either of them.

Figure 3:
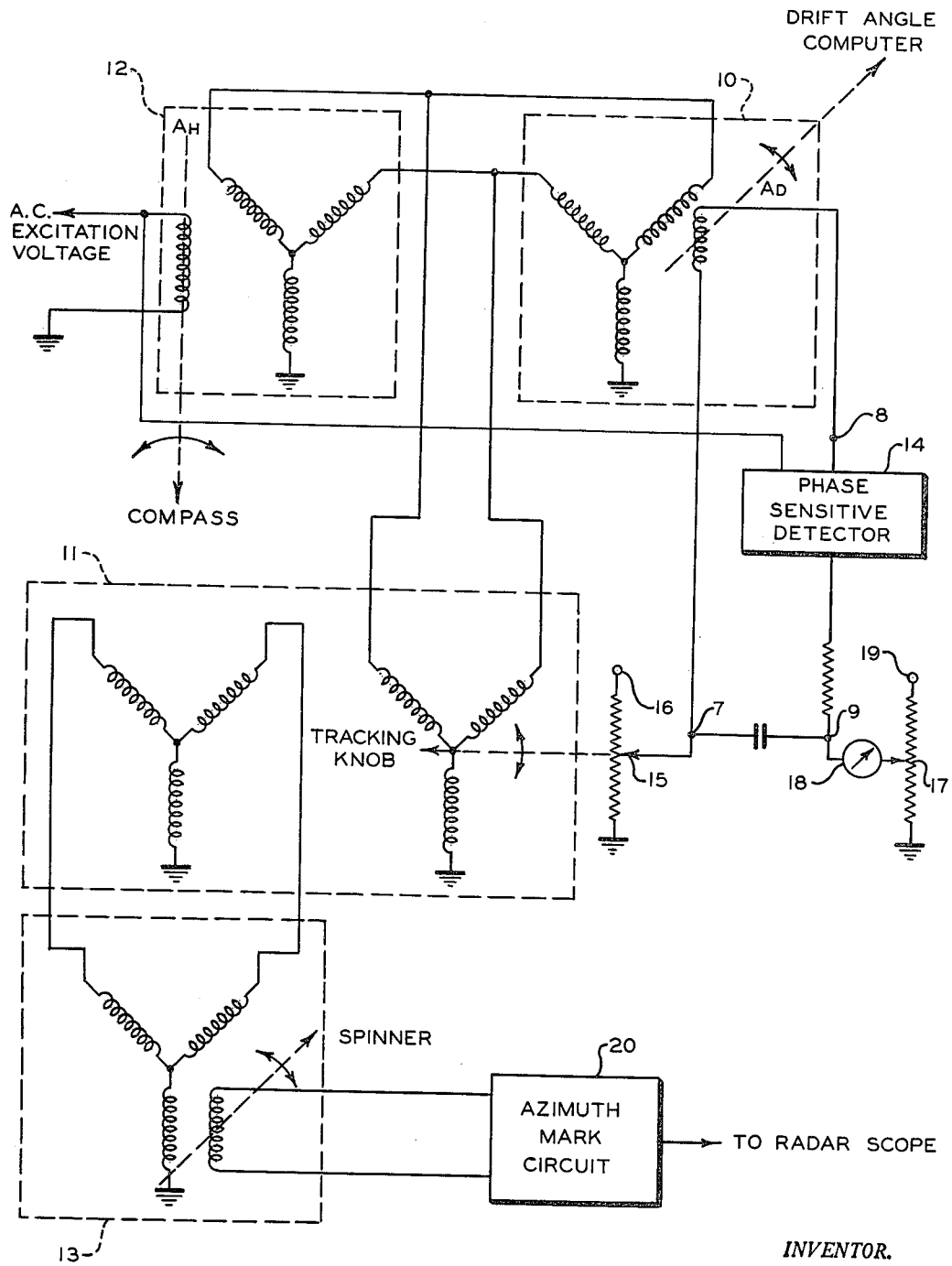
Fig. 3 illustrates the instrumentation of one embodiment of the invention and its relation to the geometry of Fig. 2.

Fig. 3 shows the instrumentation of the present invention. The P. D. I. 18 and a phase sensitive detector 14 are connected between the sliding contacts of potentiometers 15 and 17 which are connected to D. C. voltage sources at terminals 16 and 19 respectively. The A. C. output of the rotor of selsyn 10 has an amplitude proportional to sin B. This A. C. output is applied to phase sensitive detector 14, which produces a D. C. voltage between points 7 and 9, which is equal to $K \sin B$. Phase sensitive detector 14, incidentally, can be similar in operation to any of the well-known A. C. phase sensitive detectors, the only difference being that in one case the ouput is A. C. and in the other the output is D. C. The shaft rotation of potentiometer 15 is proportional to angle A, and when angles A and B are both zero the P. D. I. is adjusted to zero deflection by means of potentiometer 17. Assuming that a short is placed between points 7 and 9, an angular rotation of potentiometer 15 proportional to angle A will give a current through meter 18 proportional to angle A. With the normal circuit, however, there is a voltage across points 7 and 9 which is equal to $K \sin B$, as stated above. Thus P. D. I. 18 will have a deflection which is proportional to the difference between the actual ground track direction and the desired ground track. The pilot then turns the aircraft until it is on the desired ground track which is when sin $$B = \frac{A}{K}$$

as previously established. When this occurs the ouput voltage of the phase sensitive detector will balance the voltage between points 15 and 17 and there will be zero current through meter 18. The pilot then maintains the plane on the correct course by keeping the P. D. I. nulled.

The D. C. voltage between points 7 and 9, as mentioned above, is obtained from two selsyns 10 and 12, and phase sensitive detector 14. The rotor of selsyn generator 12 is excited by a constant value A. C. voltage. The electrical output of the stator represents the heading of the aircraft with respect to north since the rotor is mechanically positioned by the ouput shaft of a compass follow-up unit. To this electrical output is added the plane's drift angle by means of control selsyn 10. The rotor of selsyn 10 is mechanically positioned by the drift angle shaft of one of the drift angle computers which are now in use. The electrical output of selsyn 10 as taken from the rotor winding therefore represents the ground track direction of the plane. The case of selsyn 10 is so arranged that it may be rotated with respect to the rotor, and is equipped with a dial graduated in degrees bearing, so that when the dial is set to the desired course direction and the ground track is also on the course direction, the ouput across the rotor of selsyn 10 goes to zero. Therefore, in obtaining coincidence between the desired course and the actual ground track, the A. C. voltage between points 7 and 8 is proportional to sin B, and by means of phase sensitive detector 14, a D. C. voltage equal to $K \sin B$ appears between points 7 and 9.

Figure 2:
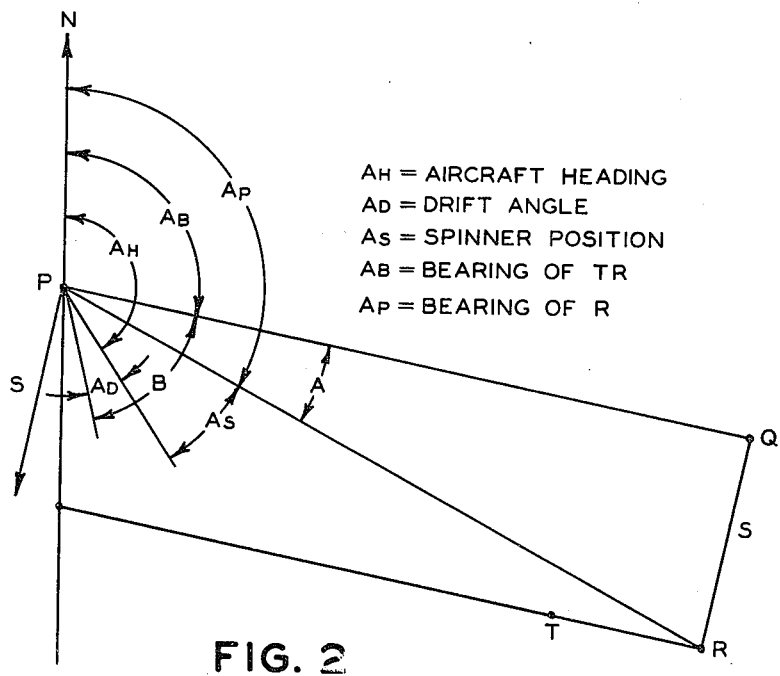
Fig. 2 illustrates the geometry as applied to the instrumentation.

The angle A is measured by manually tracking the reference target in azimuth on the detection system indicator which is very frequently a suitably connected oscilloscope. This is done by means of an electronically produced azimuth mark which intensifies the scope trace at the desired azimuth, and is controllable by the detection system operator. The information for the azimuth mark is obtained from selsyn generator 12, differential selsyn 11, and control transformer selsyn 13 all operated in series. From Fig. 2 it can be seen that there is a certain spinner angle $A_s$ with respect to the plane's heading, which when subtracted from the plane's heading with respect to north, $A_H$, gives the bearing $A_P$, which is the reference target bearing with respect to north, and can be considered as being the sum of two angles, $A_B$, the course direction, and A, the angle being measured. Differential selsyn 11 subtracts electrically the angle to which its rotor is set by tracking knob 11 from the heading angle $A_H$, which information is provided by selsyn generator 12. This difference angle $A_s$ is the angle through which the spinner must rotate from the heading direction $A_H$ in order to be pointed in the direction of the reference target. To accomplish this, the electrical output of the stator winding of differential selsyn 11 is impressed upon the stator windings of control transformer selsyn 13, and from this output is subtracted the angle of rotation of the spinner which is mechanically coupled to the rotor of selsyn 13. When this rotation equals the difference angle, $A_s$, there is a null across the rotor of selsyn 13, the necessary condition for azimuth mark circuit 20 to produce an azimuth mark. This satisfies the condition that $A_H - A_P = A_s$, so the angle as set by tracking knob 11, mentioned above, is angle $A_P$. The stator of selsyn 11 is so rotated with respect to the rotor, that an azimuth mark appears when the spinner is in the course direction $A_B$, and the tracking knob is set at the zero position. Since $A_P = A_B + A$, the angle of rotation of the shaft of selsyn 11, which is ganged to the shaft of potentiometer 15, is a measure of angle A when the azimuth mark is placed on the reference target indication on the scope face.

Operationally, then, this equipment provides simple preliminary adjustments and straightforward application in flight. Before the start of the bombing run or blind landing approach, the desired course bearing is determined from a map, and the graduated dial of selsyn 10 set to this bearing. A second adjustment is the proper adjustment of potentiometer 17 to its zero setting. During the approach the aircraft is put on course by having the detection system operator continually keeping the azimuth mark and reference target indication coincident on the detection system indicator by adjustment of tracking knob 11, and with the pilot steering by means of the P. D. I. No intercommunication system is necessary.

Summarily, this steering system can be used in conjunction with other equipment which provides an accurate compass take off, a method for presenting accurate drift angle data, and a suitable radio pulse echo detection system.

While this description has referred to the application of the invention to aircraft use, it is to be understood that it can be adapted for use with ships as well. It is obvious to those skilled in the art that various changes and modifications may be made to this invention without departing from the scope of the invention.

What is claimed is:

1. Navigation apparatus for steering a desired course comprising, a radio pulse echo detection system including a spinner for the continuous determination of bearing of a reference object, means for adjusting an azimuth marker to coincide in bearing with said reference object, a selsyn generator, the rotor winding of said selsyn generator positioned by a compass, a selsyn follower, the rotor winding of said selsyn follower positioned by a drift indicator, the stator windings of said selsyn generator being coupled to the stator windings of said selsyn follower, means to adjust the angular orientation of said stator windings of said selsyn follower in a manner proportional to said desired course, a rectifier adapted to rectify the voltage developed across the rotor winding of said selsyn follower, a variable voltage source coupled to said azimuth marker adjustment, said voltage source providing a voltage proportional to the relative bearing of said reference object, a meter operated by the difference between the outputs of said voltage source and said selsyn follower, said meter indicating the deviation of ship's heading from said desired course.

2. Navigational apparatus as in claim 1, said means for adjusting an azimuth marker to coincide with said reference target comprising, a differential selsyn, the rotor of said differential selsyn electrically fed by the output of selsyn generator of said computer, the rotor of said differential selsyn mechanically positioned by a tracking knob, a control transformer selsyn, the stator windings of said control transformer selsyn coupled to the stator windings of said differential selsyn, the rotor of said control transformer selsyn mechanically positional by the spinner of said radio pulse echo detection system, an azimuth mark circuit, the electrical output of said rotor of said control transformer selsyn coupled to said azimuth mark circuit, said azimuth mark circuit producing an azimuth mark when the electrical output across said rotor of said control transformer selsyn equals zero, the combination of said differential selsyn, said control transformer selsyn, and said azimuth mark circuit producing an azimuth mark when the axis of said spinner coincides with the line of direction between the ship and the reference object, and said tracking knob is properly positioned.

3. Navigation apparatus for steering a moving craft onto a desired linear course, said navigation apparatus including, a compass follow-up unit, a selsyn generator having a rotor including a rotor winding and having a stator including a stator winding, said rotor being mechanically positioned by said compass follow-up unit, a craft drift angle computer, a control selsyn having a rotor including a rotor winding and having a stator including a stator winding, said stator winding of said selsyn generator being electrically coupled to said stator winding of said control selsyn, said rotor of said control selsyn being mechanically positioned by said craft drift angle computer, and means for adjusting the angular orientation of said stator of said control selsyn with respect to said rotor independently of said mechanical positioning of said rotor.

4. In combination with a radio pulse echo detection system for the continuous determination of the position of a reference object with respect to said craft, navigation apparatus for steering a craft onto a desired linear course including said reference object, said navigation apparatus comprising, a generator of a first signal having an amplitude proportional to the sine of the instantaneous angle included between the ground track direction of said craft and said linear course direction, an azimuth mark generator, means coupled to said azimuth mark generator for controlling the occurrence times of the azimuth marks generated by said mark generator, a generator controlled by said azimuth mark controller means for generating a second signal of controllable amplitude, said second signal, when said azimuth marks have occurrence times in predetermined relationship with the bearing of said reference object with respect to said craft, having an amplitude proportional to the instantaneous angle included between the desired course direction and the bearing of said reference object with respect to said craft.

5. In combination with a radio pulse echo detection system for the continuous determination of the position of a reference object with respect to said craft, a compass, a drift angle computer and means for generating an azimuth marker, said radio pulse echo detection system including a spinner, navigation apparatus for steering a craft onto a desired course comprising, means operatively associated with said compass for producing a first signal in accordance with the azimuth heading of said craft, means operatively associated with said drift angle computer and responsive to said first signal for generating a second signal having an amplitude proportional to the sine of the instantaneous angle defined by the bearing direction of said craft and the direction of said desired course, means operatively associated with said spinner and responsive to said first signal for adjusting said azimuth marker generator to maintain the generated azimuth markers in time coincidence with the times said spinner is directed at said reference object, means coupled to said last-mentioned means for generating a third signal having an amplitude proportional to the angle defined by said desired course direction and the bearing of said reference object with respect to said craft and means responsive to said second and third signals for indicating the direction and magnitude of the deviation of said craft's heading from said desired course.

6. In combination with a radio pulse echo detection system for the continuous determination of the position of a reference object, a compass, a drift angle computer and means for generating an azimuth marker, said radio pulse echo detection system including a spinner, navigation apparatus for steering a craft on a desired course, said navigation apparatus comprising, means for adjusting said azimuth marker generator to maintain said azimuth marker in time coincidence with the times said spinner is directed at said reference object, a generator unit having a rotor including a rotor winding and having a stator including a stator winding, said rotor of said generator unit being positioned by said compass, a control transformer unit having a rotor including a rotor winding and having a stator including a stator winding, said rotor of said control transformer unit being positioned by said drift angle computer, said stator winding of said generator unit being coupled to said stator winding of said control transformer unit, said generator unit generating at its stator winding an electrical signal corresponding to the position of its rotor, said control transformer unit generating a signal at its rotor winding having an amplitude proportional to the sine of the instantaneous angle of rotation of its rotor with respect to the magnetic field of its stator, means for adjusting the angular orientation of said stator winding of said control transformer unit by an amount proportional to said desired course, means for rectifying the signal generated at said rotor winding of said control transformer unit, a variable voltage source coupled to said azimuth marker adjusting means, said variable voltage source providing a voltage proportional to the bearing of said reference object with respect to said craft and a meter operated by the difference between the output of said voltage source and said signal generated at the rotor winding of said control transformer unit, said meter indicating the deviation of said craft's heading from said desired course.

7. In combination with a radio pulse echo detection system for the continuous determination of the position of a reference object, a compass, a drift angle computer, and an azimuth mark generator, said radio pulse echo detection system including a spinner, navigation apparatus for steering a craft onto a desired linear course including said reference object, said navigation apparatus comprising, a first generator for generating a first signal having an amplitude proportional to the sine of the instantaneous angle included between the ground track direction of said craft and said desired course direction, said first generator comprising a selsyn generator having a rotor including a rotor winding and having a stator including a stator winding, said rotor being mechanically positioned by said compass, a control selsyn having a rotor including a rotor winding and having a stator including a stator winding, said stator winding of said selsyn generator being electrically coupled to said stator winding of said control selsyn, said rotor of said control selsyn being mechanically positioned by said drift angle computer, means for adjusting the angular orientation of said stator of said control selsyn and a phase sensitive detector electrically coupled to said rotor winding of said control transformer, said first signal appearing at the output of said phase sensitive detector, a second generator operatively associated with said first generator for generating a second signal, said second generator comprising, a differential selsyn having a rotor including a rotor winding and having a stator including a stator winding, said rotor winding of said differential selsyn being electrically coupled to said stator winding of said selsyn generator and said stator winding of said control selsyn, means for adjusting the angular orientation of said stator of said differential selsyn, a control transformer selsyn having a rotor including a rotor winding and having a stator including a stator winding, said stator winding of said control transformer selsyn being electrically coupled to said stator winding of said differential selsyn, said rotor of said control selsyn transformer being mechanically positioned by said spinner and electrically coupled to said azimuth mark generator, the occurrence times of the azimuth marks generated by said mark generator being dependent upon the signal across said rotor winding of said control selsyn transformer, a source of supply potential, and voltage divider means coupled to said potential source and mechanically coupled to said rotor of said differential generator for generating said second signal in accordance with the angular position of said rotor of said differential selsyn, said second signal having an amplitude, when said signal across said rotor winding of said selsyn control transformer is such as to cause said generated azimuth marks to coincide in time with the times said spinner is directed at said reference object, proportional to the instantaneous angle included between said desired course direction and the bearing of said reference object with respect to said craft, thereby enabling said craft to be steered onto said desired course by maintaining said second signal at an amplitude proportional to the instantaneous angle included between said desired course direction and the bearing of said reference object with respect to said craft and by steering said craft to maintain a predetermined relationship between said first and second signals.

References Cited in the file of this patent

UNITED STATES PATENTS

| | | |
|---|---|---|
| 2,137,847 | Libman | Nov. 22, 1938 |
| 2,419,970 | Roe | May 6, 1947 |
| 2,420,017 | Sanders | May 6, 1947 |
| 2,420,334 | White | May 13, 1947 |
| 2,438,112 | Darlington | Mar. 23, 1948 |
| 2,529,823 | Starr | Nov. 14, 1950 |
| 2,550,700 | Lancor et al. | May 1, 1951 |
| 2,666,914 | Chance | Jan. 19, 1954 |